US008724657B2

(12) United States Patent
Kuila et al.

(10) Patent No.: US 8,724,657 B2
(45) Date of Patent: May 13, 2014

(54) SYSTEM AND METHOD FOR OFFLOADING PACKET PROTOCOL ENCAPSULATION FROM SOFTWARE

(75) Inventors: Kaushik Kuila, San Jose, CA (US); David T. Hass, Santa Clara, CA (US); Ahmed Shahid, San Jose, CA (US)

(73) Assignee: NetLogic Microsystems, Inc., Irvine, CA (US)

( * ) Notice: Subject to any disclaimer, the term of this patent is extended or adjusted under 35 U.S.C. 154(b) by 22 days.

(21) Appl. No.: 13/205,420

(22) Filed: Aug. 8, 2011

(65) Prior Publication Data

US 2012/0027029 A1 Feb. 2, 2012

Related U.S. Application Data

(63) Continuation of application No. 12/120,082, filed on May 13, 2008, now Pat. No. 7,995,596.

(51) Int. Cl.
*H04J 3/24* (2006.01)
*H04L 12/56* (2006.01)

(52) U.S. Cl.
CPC ........... *H04L 49/901* (2013.01); *H04L 49/9021* (2013.01); *H04L 49/9042* (2013.01)
USPC ...................................................... 370/474

(58) Field of Classification Search
CPC .................................................... H04L 49/901
USPC ......................................... 370/379, 382, 469
See application file for complete search history.

(56) References Cited

U.S. PATENT DOCUMENTS

| | | | |
|---|---|---|---|
| 5,396,490 A | 3/1995 | White et al. | |
| 5,596,564 A * | 1/1997 | Fukushima et al. | 386/246 |
| 5,950,231 A | 9/1999 | Nichol | |
| 6,697,366 B1 * | 2/2004 | Kim | 370/392 |
| 6,701,447 B1 | 3/2004 | Bass et al. | |
| 6,963,921 B1 | 11/2005 | Yang et al. | |
| 6,990,535 B1 | 1/2006 | Yang et al. | |
| 7,733,888 B2 * | 6/2010 | Mathews et al. | 370/412 |
| 7,818,389 B1 | 10/2010 | Chiang et al. | |
| 7,995,596 B2 | 8/2011 | Kuila et al. | |
| 2002/0099881 A1 * | 7/2002 | Gugel | 710/26 |
| 2004/0085962 A1 | 5/2004 | Sugai et al. | |
| 2004/0228339 A1 | 11/2004 | Gallo et al. | |
| 2005/0055504 A1 | 3/2005 | Hass et al. | |
| 2006/0080479 A1 | 4/2006 | Anjo et al. | |
| 2006/0271721 A1 | 11/2006 | Beukema et al. | |

FOREIGN PATENT DOCUMENTS

WO    WO 2009/139805 A3    1/2010

OTHER PUBLICATIONS

International Search Report and Written Opinion from PCT Application No. PCT/US09/01685, mailed on May 5, 2009.

* cited by examiner

*Primary Examiner* — Mark Rinehart
*Assistant Examiner* — Maharishi Khirodhar
(74) *Attorney, Agent, or Firm* — Sterne, Kessler, Goldstein & Fox, PLLC

(57) ABSTRACT

A method and system of packet assembly is provided. The method includes providing a first packet descriptor. The first packet descriptor is a pointer-to-pointer (P2P) descriptor that includes pointer information. The method further includes retrieving a first pointer referenced by the pointer information of the first packet descriptor; providing the first pointer to a DMA engine; and using the DMA engine to retrieve packet data referenced by the first pointer.

16 Claims, 5 Drawing Sheets

SYSTEM AND METHOD FOR OFFLOADING PACKET PROTOCOL ENCAPSULATION FROM SOFTWARE

RELATED APPLICATIONS

This application is a continuation of U.S. application Ser. No. 12/120,082 filed on May 13, 2008, which is hereby incorporated by reference in its entirety.

FIELD OF THE INVENTION

The present invention relates to networked computer systems, and more particularly to packet protocol encapsulation.

BACKGROUND

Some networking applications may require the addition, deletion, or replacement of bytes in a packet. Typically, processors running such applications copy parts of the incoming packet to memory and make the relevant modifications before transmitting the packet. This often consumes valuable memory and processing time.

There is thus a need for addressing these and/or other issues associated with the prior art.

SUMMARY

A method is provided for offloading packet protocol encapsulation from software. In operation, pointer information to various packet segments and protocol headers is received. Furthermore, packet protocol encapsulation is offloaded from software by assembling packets in hardware, using the pointer information.

DETAILED DESCRIPTION

Figure 1:
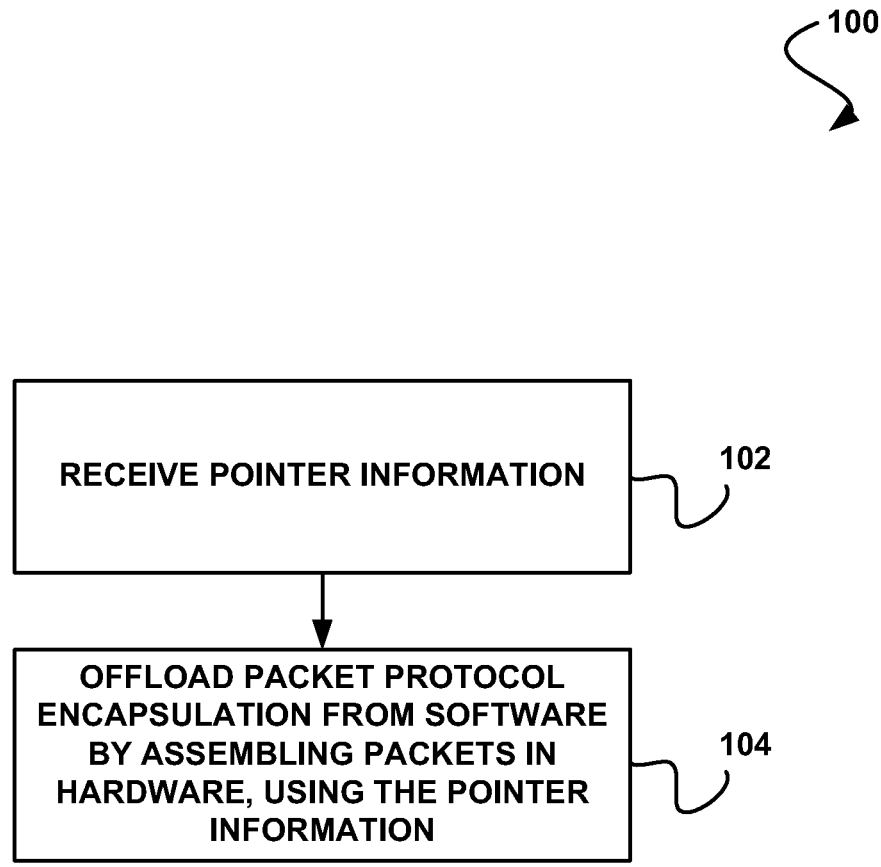
FIG. 1 shows a method for offloading packet protocol encapsulation from software, in accordance with one embodiment.

FIG. 1 shows a method 100 for offloading packet protocol encapsulation from software, in accordance with one embodiment. As shown, pointer information is received. See operation 102.

In the context of the present description, pointer information refers to any information associated with one or more pointers. For example, in various embodiments, the pointer information may include, but is not limited to, a plurality of pointers, a single pointer that points to a plurality of pointers, destination identifiers, and/or any other pointer information that meets the above definition.

Furthermore, a pointer refers to any data that refers to, or points to, a stored value or data. For example, in one embodiment, the pointer may include address information. As an option, the pointer information or the pointer may include length information associated with the data to which the pointer is pointing.

As shown further in FIG. 1, packet protocol encapsulation is offloaded from software by assembling packets in hardware, using the pointer information. See operation 104. In one embodiment, the pointer information may be used to look up packet protocol encapsulation information from memory. In another embodiment, the pointer information may be used to look up additional pointer information from memory.

In the context of the present description, packet protocol encapsulation refers to encapsulating network protocol information in a packet. For example, in various embodiments, the protocol information may include, but is not limited to, multi-protocol label switching (MPLS) headers, Internet protocol headers, security headers, virtual local-area network (VLAN) tags, and/or any other protocol information that meets the above definition.

Furthermore, software refers to any software or driver capable of packet protocol encapsulation. For example, in various embodiments, the software may include, but is not limited to, a Linux operating system driver, a Windows operating system driver, and/or any other software that meets the above definition. Additionally, hardware refers to any hardware capable of packet protocol encapsulation. For example, in one embodiment, the hardware may include media access control (MAC) hardware.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
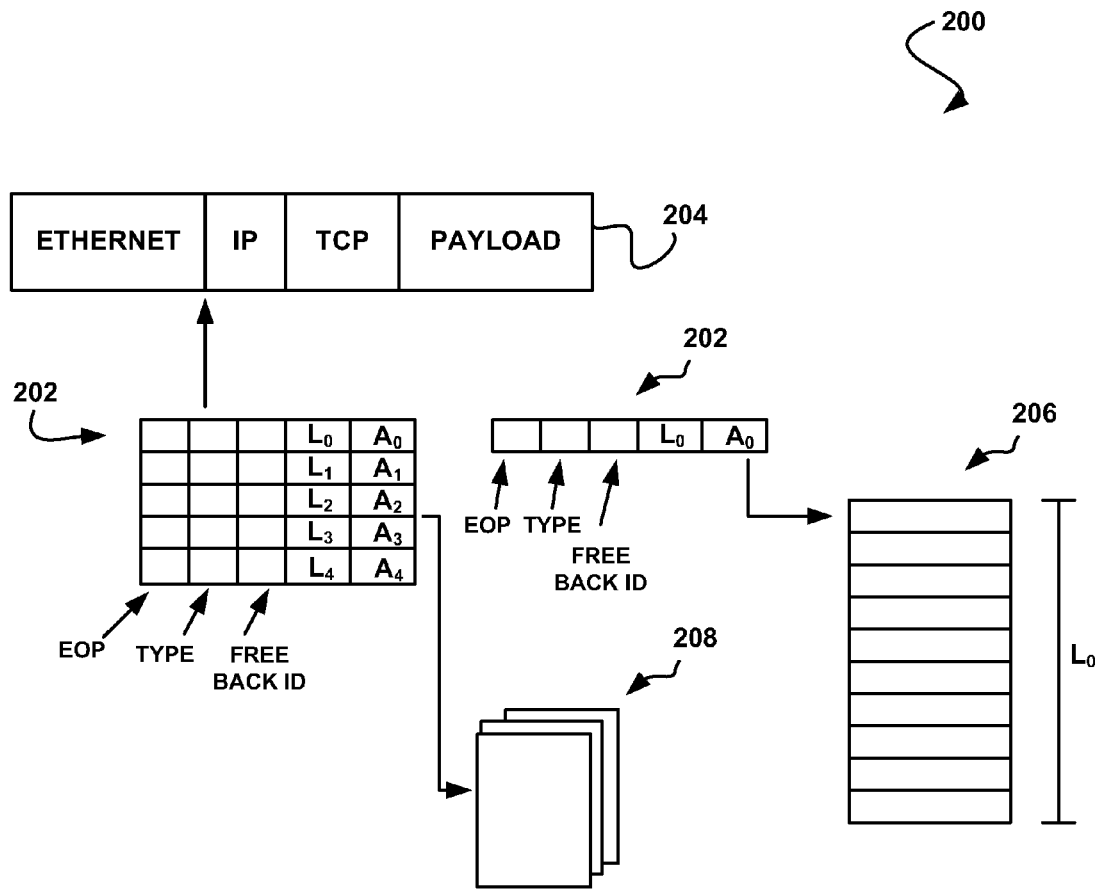
FIG. 2 shows a system for offloading packet protocol encapsulation from software, in accordance with one embodiment.

FIG. 2 shows a system 200 for offloading packet protocol encapsulation from software, in accordance with one embodiment. As an option, the present system 200 may be implemented in the context of FIG. 1. Of course, however, the system 200 may be implemented in any desired environment. It should also be noted that the aforementioned definitions may apply during the present description.

As shown, pointer information 202 is used to assemble a packet 204 such that packet protocol encapsulation to encapsulate various headers is performed in the hardware. In this way, copy operations involving packet assembly in software may be avoided.

As an option, the pointer information 202 may include one or more pointers. The pointers may each include address information ($A_n$) which point to a physical base address of an array of packet descriptors. For example, the address may point to an array 206 of P2D (pointer-to-data) type packet descriptors.

Furthermore, the pointer information 202 may include a length ($L_n$) which indicates the length of the array 206. In this case, the length may indicate the number of descriptors in the array. Additionally, the pointer information 202 may further include end of packet information (EOP), such as an end of packet bit.

The pointer information 202 may also include information defining a pointer type. For example, the pointer information 202 may include a bit indicating whether the pointer type is a P2D type packet descriptor or a pointer-to-pointer (P2P) type packet descriptor. In addition, the pointer information may include a Free Back ID (FBID).

In this case, the Free Back ID may make it possible for a consumer of a packet to recycle the packet data buffers directly back to the originator. For example, if a packet is received by a network interface and subsequently forwarded to a CPU thread, which must then forward the packet to another network interface for transmission, the network interface controller may dispose of the exhausted packet buffer memory by returning it to the originating network interface controller upon consumption of the packet. Thus, by setting the FBID field in the descriptor, to the originating network interface controller destination ID, the consumed buffer may be automatically recycled to the original network interface by hardware.

In this way, the pointer information may include an identifier of a processor to which the pointer information is to be returned, after at least one of the packets is assembled. In this case, the processor may include a first processor that is different from a second processor from which the pointer information is received. As another option, the pointer information may include an instruction for returning the pointer information to an available pointer buffer, after at least one of the packets is assembled.

In operation, a packet including a payload, a TCP header, an IP header, and an Ethernet header may be received. It may be desirable to insert information such as VLAN tags, MPLS headers, IP headers, and/or security headers between the Ethernet and the IP header. In this case, the information may include an address and length associated with data in a buffer. Thus, a list of descriptors/pointers may be developed such that address and length information may be utilized to access associated data. In this case, the list of pointers may be included in a data structure including additional information.

Figure 3:
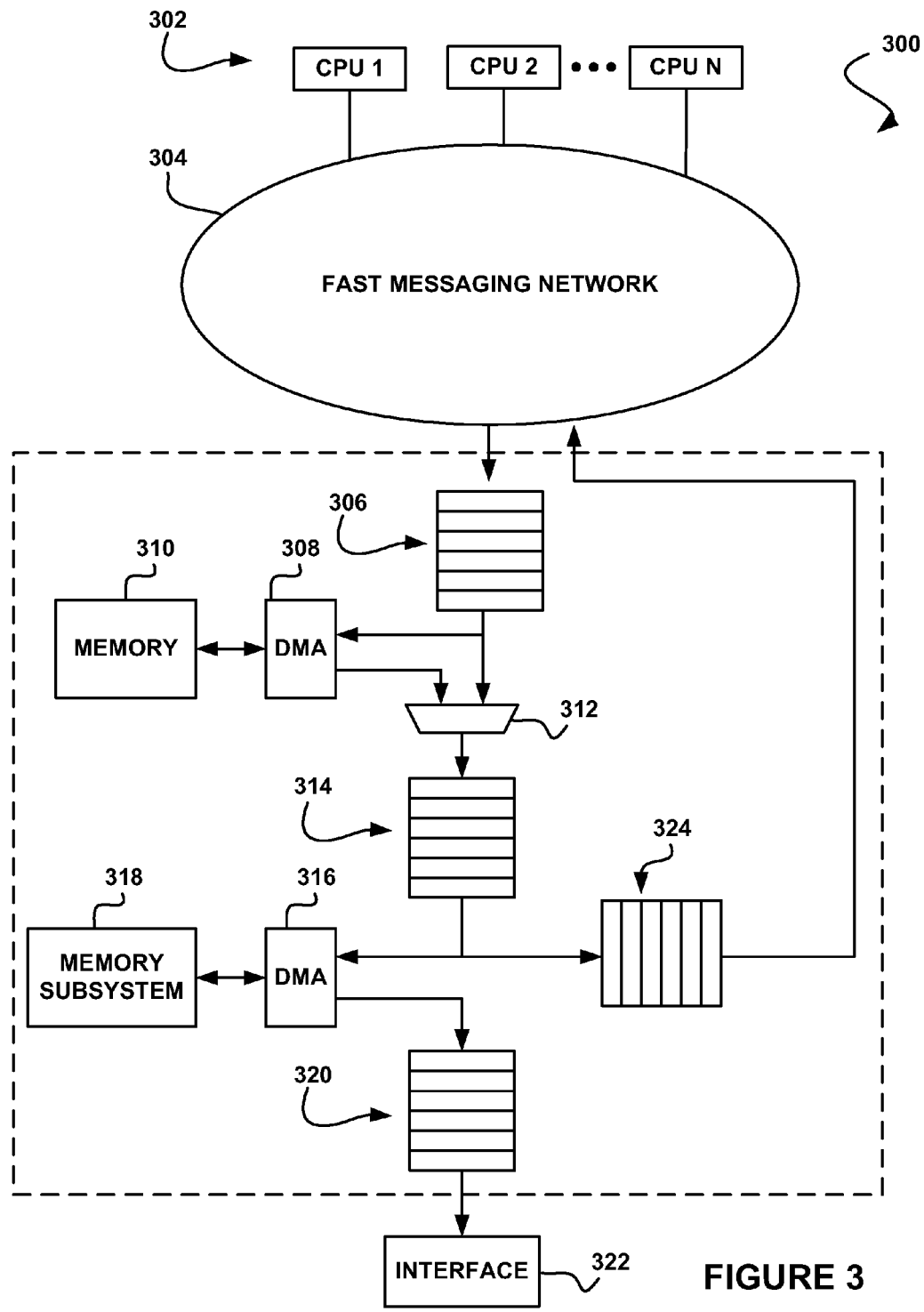
FIG. 3 shows a system egress path for offloading packet protocol encapsulation from software to hardware, in accordance with one embodiment.

FIG. 3 shows a system 300 egress path for offloading packet protocol encapsulation from software to hardware, in accordance with one embodiment. As an option, the present system 300 may be implemented in the context of the functionality and architecture of FIGS. 1-2. Of course, however, the system 300 may be implemented in any desired environment. Again, the aforementioned definitions may apply during the present description.

In operation, one or more central processing units 302 transmit a packet by creating a packet using pointer information and placing the pointer information on a fast messaging network (FMN) 304 in the form of a packet descriptor. The packet descriptor is placed into a FIFO 306. If the packet descriptor is a P2P descriptor, the packet descriptor is routed to a DMA (direct memory access) engine 308 such that information associated with the packet descriptor may be retrieved from memory 310, using pointers associated with the packet descriptor.

If the packet descriptor is not a P2P descriptor, the packet is routed through a multiplexer 312 into another FIFO 314. A DMA engine 316 is then used to fetch packet data from a memory subsystem 318. The packet data is written to a FIFO 320 and the packet data is sent out via the interface 322.

Upon transmission, the packet descriptor sent to the FIFO 314 is sent to at least one of the CPUs 302 via a FIFO 324 and the FMN 304. The receiving CPU may then use this information as a sign of transmit complete. In this way, pointer information may be stored temporarily in a FIFO 324 until packet transmission is complete. The FIFO 314 can be used in conjunction with the FIFO 324 to handle re-transmission of the assembled packets.

Figure 4:
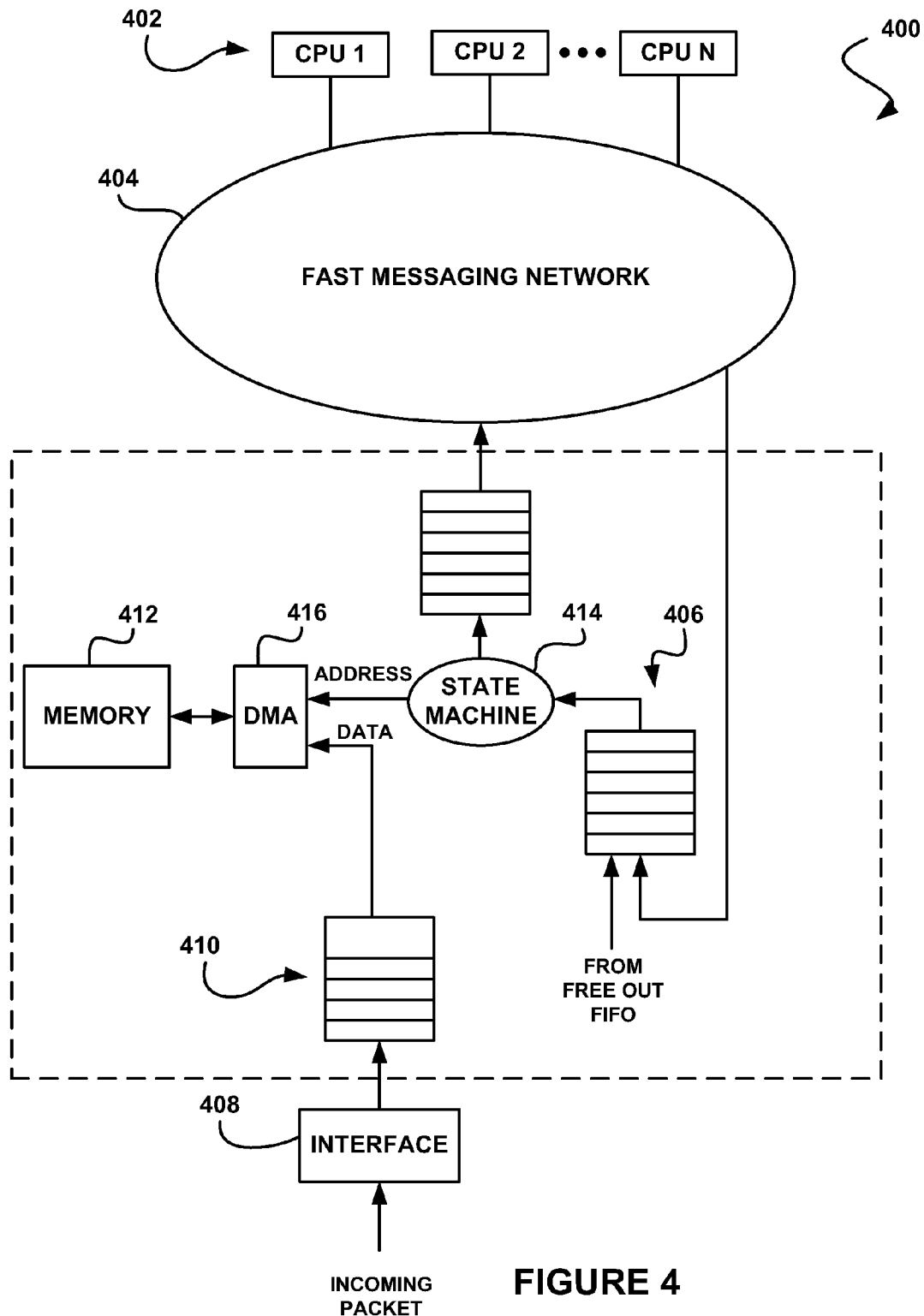
FIG. 4 shows a system ingress path using automatic memory management to recycle egress buffers for incoming ingress traffic, in accordance with one embodiment.

FIG. 4 shows a system 400 ingress path for offloading packet protocol encapsulation from software to hardware, in accordance with one embodiment. As an option, the present system 400 may be implemented in the context of the functionality and architecture of FIGS. 1-3. Of course, however, the system 400 may be implemented in any desired environment. Further, the aforementioned definitions may apply during the present description.

In operation, at least one of a plurality of CPUs 402 allocates memory and assigns pointer addresses to the memory. These pointers are sent through an ingress data path via a fast messaging network 404 to a Free-in FIFO 406. Additionally, a packet on a network is received via the interface 408, placed in a FIFO 410 and subsequently stored in memory 412 at an address read out from the Free-in-FIFO 406. A packet descriptor is then generated and sent to at least one of the CPUs 402 via the FMN 404. In this case, a state machine 414 and/or a DMA engine 416 may be utilized to parse packet header information and create a packet descriptor.

Figure 5:
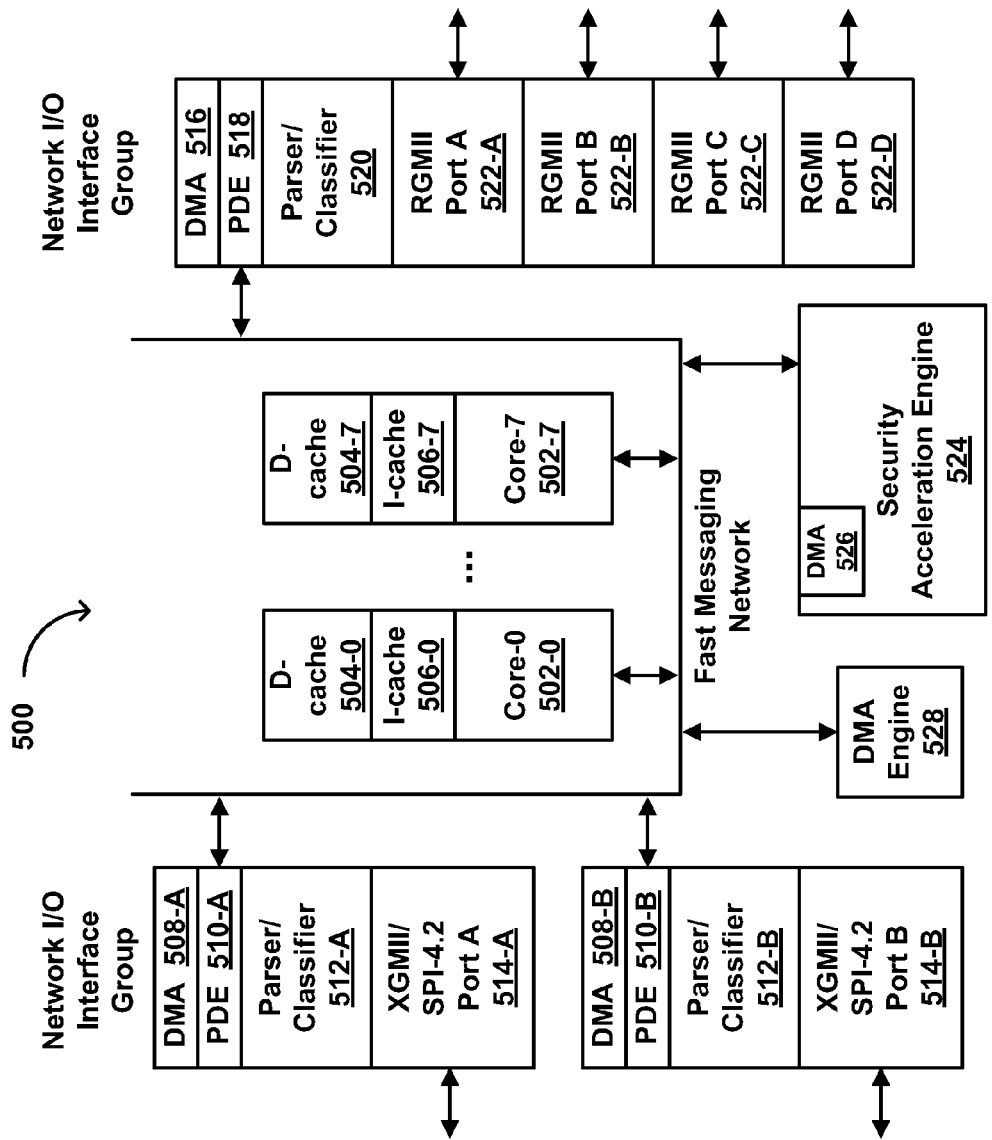
FIG. 5 shows a system illustrating various agents attached to a fast messaging network (FMN), in accordance with one embodiment.

FIG. 5 shows a system 500 illustrating various agents attached to a fast messaging network (FMN), in accordance with one embodiment. As an option, the present system 500 may be implemented in the context of the functionality and architecture of FIGS. 1-4. Of course, however, the system 500 may be implemented in any desired environment. Again, the aforementioned definitions may apply during the present description.

As shown, eight cores (Core-0 502-0 through Core-7 502-7) along with associated data caches (D-cache 504-0 through 504-7) and instruction caches (I-cache 506-0 through 506-7) may interface to an FMN. Further, Network I/O Interface Groups can also interface to the FMN. Associated with a Port A, a DMA 508-A, a Parser/Classifier 512-A, and an XGMII/SPI-4.2 Port A 514-A can interface to the FMN through a Packet Distribution Engine (PDE) 510-A. Similarly, for a Port B, a DMA 508-B, a Parser/Classifier 512-B, and an XGMII/SPI-4.2 Port B 514-B can interface to the FMN through a PDE 510-B. Also, a DMA 516, a Parser/Classifier 520, an RGMII Port A 522-A, an RGMII Port B 522-B, an RGMII Port C 522-C, and an RGMII Port D 522-D can interface to the FMN through a PDE 518. Also, a Security Acceleration Engine 524 including a DMA 526 and a DMA Engine 528 can interface to the FMN.

In one embodiment, all agents (e.g. cores/threads or networking interfaces, such as shown in FIG. 5) on the FMN can send a message to any other agent on the FMN. This structure can allow for fast packet movement among the agents, but software can alter the use of the messaging system for any other appropriate purpose by so defining the syntax and semantics of the message container. In any event, each agent on the FMN may include a transmit queue and a receive queue. Accordingly, messages intended for a particular agent can be dropped into the associated receive queue. All messages originating from a particular agent can be entered into the associated transmit queue and subsequently pushed on the FMN for delivery to the intended recipient.

In another aspect of embodiments of the invention, all threads of the core (e.g., Core-0 502-0 through Core-7 502-7) can share the queue resources. In order to ensure fairness in sending out messages, a "round-robin" scheme may be implemented for accepting messages into the transmit queue. This can guarantee that all threads have the ability to send out messages even when one of them is issuing messages at a faster rate. Accordingly, it is possible that a given transmit queue may be full at the time a message is issued. In such a case, all threads may be allowed to queue up one message each inside the core until the transmit queue has room to accept more messages. Further, the networking interfaces may use the PDE to distribute incoming packets to the designated threads. Further, outgoing packets for the networking interfaces may be routed through packet ordering software.

As an example of one implementation of the system 500, packets may be received by a network interface. The network interface may include any network interface. For example, in various embodiments, the network interface may include a Gigabit Media Independent Interface (GMII), a Reduced Gigabit Media Independent Interface (RGMII), or any other network interface.

When the network interface begins to receive a packet, the network interface stores the packet data in memory, and notifies software of the arrival of the packet, along with a notification of the location of the packet in memory. In this case, the storing and the notification may be performed automatically by the network interface, based on parameters set up by software.

In one embodiment, storing the packet may include allocating memory buffers to store the packet. For example, as packet data arrives, a DMA may consume preallocated memory buffers and store packet data in memory. As an option, the notification of the arrival of the packet may include deciding which thread of a plurality of CPUs should be notified of the arrival.

In one embodiment, the incoming packet data may be parsed and classified. Based on this classification, a recipient thread may be selected from a pool of candidate recipient threads that are designed to handle packets of this kind A message may then be sent via the FMN to the designated thread announcing its arrival. By providing a flexible feedback mechanism from the recipient thread, the networking interfaces may achieve load balancing across a set of threads.

A single FMN message may contain a plurality of packet descriptors. Additional FMN messages may be generated as desired to represent long packets. In one embodiment, packet descriptors may contain address data, packet length, and port of origin data. One packet descriptor format may include a pointer to the packet data stored in memory. In another case, a packet descriptor format may include a pointer to an array of packet descriptors, allowing for packets of virtually unlimited size to be represented.

As an option, a bit field may indicate the last packet descriptor in a sequence. Using packet descriptors, network accelerators and threads may send and receive packets, create new packets, forward packets to other threads, or any device, such as a network interface for transmission. When a packet is finally consumed, such as at the transmitting networking interface, the exhausted packet buffer may be returned to the originating interface so it can be reused.

In one embodiment, facilities may exist to return freed packet descriptors back to their origin across the FMN without thread intervention. Although, FMN messages may be transmitted in packet descriptor format, the FMN may be implemented as a general purpose message-passing system that can be used by threads to communicate arbitrary information among them.

In another implementation, at system start-up, software may provide all network interfaces with lists of fixed-size pre-allocated memory called packet buffers to store incoming packet data. Pointers may then be encapsulated to the packet buffers in packet descriptors, and sent via the FMN to the various network interfaces.

Each interface may contain a Free-In Descriptor FIFO used to queue up these descriptors. Each of these FIFOs may correspond to a bucket on the FMN. At startup, initialization software may populate these FIFOs with free packet descriptors. In one embodiment, the Free-In Descriptor FIFO may hold a fixed number of packet descriptors on-chip (e.g. 128, 256, etc.) and be extended into memory using a "spill" mechanism.

For example, when a FIFO fills up, spill regions in memory may be utilized to store subsequent descriptors. These spill regions may be made large enough to hold all descriptors necessary for a specific interface. As an option, the spill regions holding the free packet descriptors may also be cached.

When a packet comes in through the receive side of the network interfaces, a free packet descriptor may be popped from the Free-In Descriptor FIFO. The memory address pointer in the descriptor may then be passed to a DMA engine which starts sending the packet data to a memory subsystem. As many additional packet descriptors may be popped from the Free-In Descriptor FIFO as are utilized to store the entire packet. In this case, the last packet descriptor may have an end-of-packet bit set.

In various embodiments, the packet descriptor may include different formats. For example, in one embodiment, a receive packet descriptor format may be used by the ingress side of network interfaces to pass pointers to packet buffers and other useful information to threads.

In another embodiment, a P2D type packet descriptor may be used by the egress side of network interfaces to access pointers to packet buffers to be transmitted. In this case, the P2D packet descriptors may contain the physical address location from which the transmitting DMA engine of the transmitting network interface will read packet data to be transmitted. As an option, the physical address may be byte-aligned or cache-line aligned. Additionally, a length field may be included within P2D Descriptors which describes the length of useful packet data in bytes.

In still another embodiment, a P2P type descriptor may be used by the egress side of network interfaces to access packet data of virtually unlimited size. The P2P type descriptors may allow FMN messages to convey a virtually unlimited number of P2D type descriptors. As an option, the physical address field specified in the P2P type descriptor may resolve to the address of a table of P2D type descriptors. In other embodiments, a free back descriptor may be used by the network interfaces to indicate completion of packet processing and a free in descriptor may be sent from threads during initialization to populate the various descriptor FIFOs with free packet descriptors.

In one embodiment, four P2D packet descriptors may be used to describe the packet data to be sent. For example, a descriptor "A1" may contain a byte-aligned address which specifies the physical memory location containing the packet data used for constructing the packet to be transmitted, a total of four of which comprise the entire packet. The byte-aligned length and byte-aligned address fields in each packet descriptor may be used to characterize the four components of the packet data to be transmitted. Furthermore, a descriptor "A4" may have an EOP bit set to signify that this is the last descriptor for this packet.

Since P2D packets can represent multiple components of a packet, packet data need not be contiguous. For example, a descriptor "A1" may address a buffer containing an Authentication Header (AH) and Encapsulating Security Protocol (ESP) readers, which may be the first chunk of data needed to build up the packet. Likewise, the second chunk of data required is likely the payload data, addressed by a descriptor "A2." The ESP authentication data and ESP trailer are the last chunk of data needed to build the packet, and so may be pointed to by a last descriptor "A3," which also has the EOP bit set signifying that this is the last chunk of data being used to form the packet. In a similar manner, other fields, such as VLAN tags, could be inserted into packets by using the byte-addressable pointers available in the P2D descriptors.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of packet assembly, comprising:
sending a first packet descriptor from a first FIFO to a second direct memory access (DMA) engine, wherein the first packet descriptor is a pointer-to-pointer (P2P) packet descriptor that includes pointer information, and the second DMA engine uses the first packet descriptor to retrieve a first pointer;
retrieving the first pointer referenced by the pointer information of the first packet descriptor,
providing the first pointer to a first DMA engine;
using the first DMA engine to retrieve packet data referenced by the first pointer;
sending a second packet descriptor from the first FIFO to the first DMA engine, wherein the second packet descriptor is a pointer-to-data (P2D) packet descriptor that includes a second pointer;
using the first DMA engine to retrieve packet data referenced by the second pointer; and
storing the first and second packet descriptors in the first FIFO.

2. The method of claim 1, further comprising:
storing the first pointer in a second FIFO, wherein providing the first pointer to the first DMA engine comprises sending the first pointer from the second FIFO to the first DMA engine.

3. The method of claim 2, further comprising:
storing the retrieved packet data referenced by the second pointer in a third FIFO; and
transmitting the retrieved packet data referenced by the second pointer via an interface coupled to the third FIFO.

4. The method of claim 1, further comprising:
transmitting the packet data referenced by the second pointer.

5. The method of claim 4, further comprising:
upon transmitting the packet data referenced by the second pointer, sending the first packet descriptor to a central processing unit (CPU); and
at the CPU, determining that the transmitting is complete based on the first packet descriptor.

6. The method of claim 5, wherein:
the CPU is one of a plurality of CPUs coupled via a network; and
sending the first packet descriptor to the CPU comprises providing the first packet descriptor to the CPU via the network.

7. The method of claim 4, further comprising:
upon transmitting the packet data referenced by the second pointer, recycling a buffer associated with the transmitted packet data referenced by the second pointer, the recycling comprising setting an identifier in the first packet descriptor.

8. The method of claim 1, wherein sending the second packet descriptor from the first FIFO to the first DMA engine comprises queuing the second packet descriptor in a second FIFO.

9. The method of claim 1, wherein the pointer information of the first packet descriptor comprises a pointer to an array of packet descriptors that includes the first pointer, the method further comprising:
providing the array of packet descriptors to the second DMA engine; and
using the second DMA engine to retrieve respective packet data referenced by respective packet descriptors of the array of packet descriptors.

10. A processor, comprising:
a first direct memory access (DMA) engine to receive pointer-to-pointer (P2P) packet descriptors that include respective pointer information and to retrieve pointers referenced by the respective pointer information;
a second DMA engine to receive the pointers referenced by the respective pointer information and to retrieve packet data referenced by the pointers;
a first FIFO, coupled to the first DMA engine, to store the packet descriptors and provide the packet descriptors to the first DMA engine;
a second FIFO, having an input coupled to the first DMA engine and an output coupled to the second DMA engine, to store the pointers and provide the pointers to the second DMA engine; and
a multiplexer having a first input coupled to the first DMA engine, a second input coupled to the first FIFO, and an output coupled to the second FIFO;
wherein the first FIFO is configured to receive both the P2P packet descriptors and pointer-to-data (P2D) packet descriptors that include pointers that reference the packet data retrieved by the second DMA engine; and
the multiplexer is configurable to provide the pointers retrieved by the first DMA engine to the second FIFO in a first setting and to provide the P2D packet descriptors to the second FIFO in a second setting.

11. The processor of claim 10, further comprising:
a third FIFO, coupled to the second DMA engine, to store the packet data retrieved by the second DMA engine; and
an interface, coupled to the third FIFO, to transmit the packet data retrieved by the second DMA engine.

12. The processor of claim 10, further comprising:
a plurality of CPUs configurable to transmit the P2P packet descriptors to the first FIFO; and
a network to couple the plurality of processors to the first FIFO.

13. The processor of claim 12, wherein the network comprises a messaging network.

14. The processor of claim 12, further comprising;
a third FIFO, coupled between the second DMA engine and the messaging network, to send the P2P packet descriptors to respective CPUs upon transmission of corresponding packet data.

15. A system, comprising:
a first direct memory access (DMA) engine to receive a pointer-to-pointer (P2P) packet descriptor that includes pointer information and to retrieve a pointer referenced by the pointer information;
a second DMA engine to receive the pointer and to retrieve packet data referenced by the pointer;
a first FIFO, coupled to the first DMA engine;
a second FIFO, having an input coupled to the first DMA engine and an output coupled to the second DMA engine; and
a multiplexer having a first input coupled to the first DMA engine, a second input coupled to the first FIFO, and an output coupled to the second FIFO;

wherein the first FIFO is configured to receive the P2P packet descriptor and a pointer-to-data (P2D) packet descriptor; and the multiplexer is configurable to provide the pointer retrieved by the first DMA engine to the second FIFO in a first setting and to provide the P2D packet descriptor to the second FIFO in a second setting.

16. The system of claim 15, further comprising a fast message network coupled to at least one of the first or second FIFO.

* * * * *